United States Patent
Black et al.

(10) Patent No.: US 10,641,907 B2
(45) Date of Patent: May 5, 2020

(54) MOUNTED X-RAY WINDOW

(71) Applicant: Moxtek, Inc., Orem, UT (US)

(72) Inventors: Kevin Black, Riverton, UT (US); Jonathan Abbott, Saratoga Springs, UT (US)

(73) Assignee: Moxtek, Inc., Orem, UT (US)

(*) Notice: Subject to any disclaimer, the term of this patent is extended or adjusted under 35 U.S.C. 154(b) by 555 days.

(21) Appl. No.: 15/437,660

(22) Filed: Feb. 21, 2017

(65) Prior Publication Data

US 2018/0323033 A1  Nov. 8, 2018

Related U.S. Application Data

(60) Provisional application No. 62/322,557, filed on Apr. 14, 2016.

(51) Int. Cl.
*H01J 5/00* (2006.01)
*G01T 1/00* (2006.01)
*H01J 5/18* (2006.01)

(52) U.S. Cl.
CPC ............ *G01T 1/00* (2013.01); *H01J 5/18* (2013.01); *H01J 2235/18* (2013.01)

(58) Field of Classification Search
CPC ........... H01J 5/18; H01J 2235/18; H01J 35/18
See application file for complete search history.

(56) References Cited

U.S. PATENT DOCUMENTS

| | | | |
|---|---|---|---|
| 4,933,557 A | 6/1990 | Perkins et al. | |
| 6,493,499 B1 | 12/2002 | Brandon et al. | |
| 7,035,379 B2 | 4/2006 | Turner et al. | |
| 7,709,820 B2 | 5/2010 | Decker et al. | |
| 7,737,424 B2 | 6/2010 | Xu et al. | |
| 7,756,251 B2 | 7/2010 | Davis et al. | |
| 8,498,381 B2 | 7/2013 | Liddiard et al. | |
| 9,305,735 B2 | 4/2016 | Liddiard et al. | |
| 9,502,206 B2 | 11/2016 | Harker et al. | |
| 2004/0120466 A1* | 6/2004 | Turner | G21K 1/10 378/161 |
| 2008/0296479 A1 | 12/2008 | Anderson et al. | |

(Continued)

FOREIGN PATENT DOCUMENTS

EP         1276188 A2    1/2003
WO    WO 2004025682 A1  3/2004

OTHER PUBLICATIONS

International Search Report dated Apr. 30, 2019, in International Application No. PCT/US2018/044289, filed Jul. 30, 2018; 3 pages.

*Primary Examiner* — Dani Fox

(74) *Attorney, Agent, or Firm* — Thorpe, North & Western, LLP

(57) ABSTRACT

A mounted x-ray window can be strong and transmissive to x-rays, can have a hermetic seal, and can withstand high temperatures. The mounted x-ray window can include a film located on an inner-side of a flange of a housing and can be attached to the flange by a ring of elastic adhesive. The film can comprise silicon nitride. A method of mounting an x-ray window can include placing a ring of elastic adhesive on an inner-side of a flange of a housing, placing a film on the ring of elastic adhesive, and baking the housing, the ring of elastic adhesive, and the film.

20 Claims, 6 Drawing Sheets

(56) References Cited

U.S. PATENT DOCUMENTS

Figure 1:
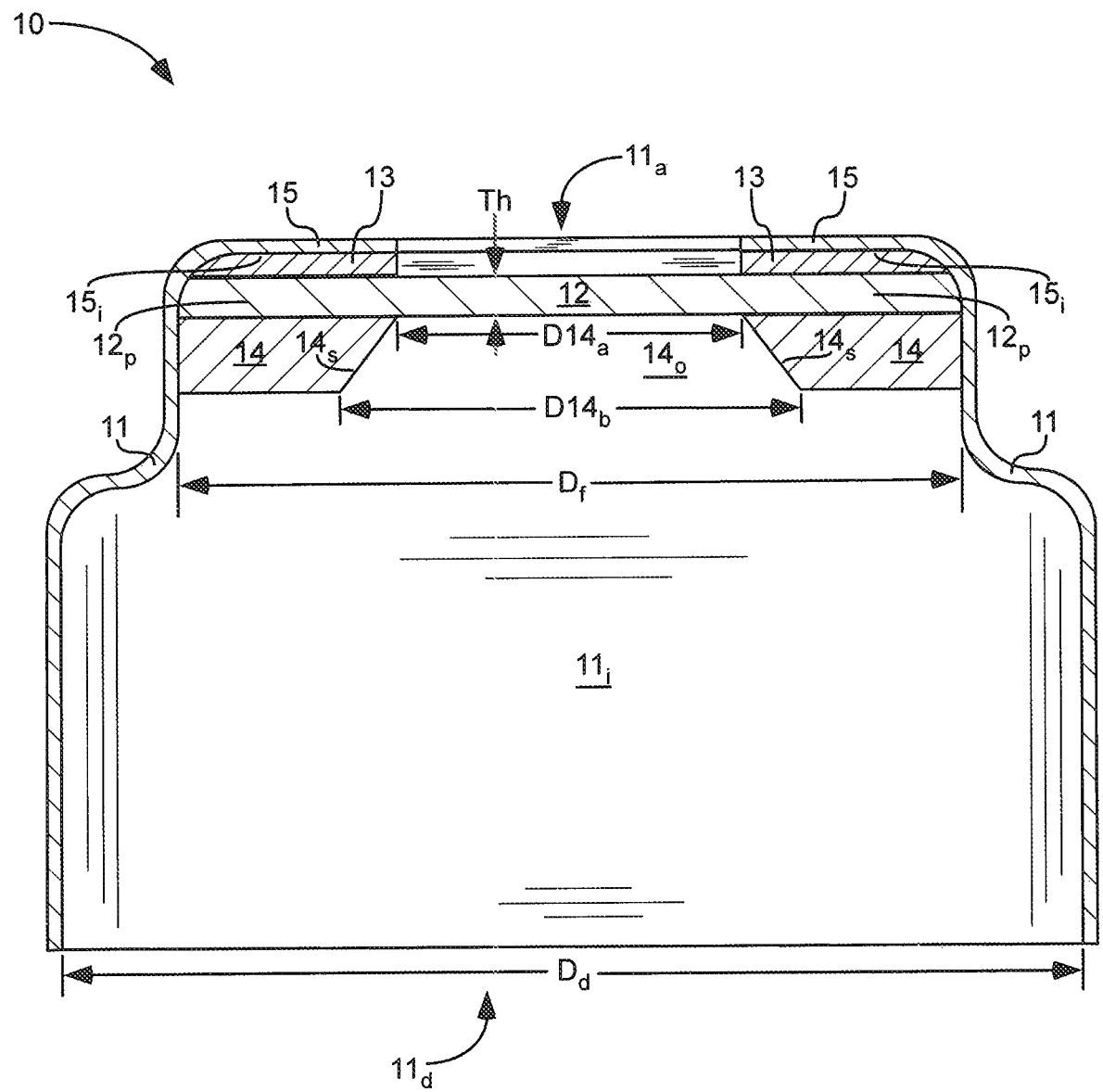

| | | |
|---|---|---|
| 2009/0212681 A1* | 8/2009 | Matsumura ............ H01J 33/04 |
| | | 313/420 |
| 2010/0126660 A1 | 5/2010 | O'Hara |
| 2011/0315886 A1 | 12/2011 | Sawada et al. |
| 2013/0094629 A1* | 4/2013 | Liddiard ................ H01J 35/18 |
| | | 378/140 |
| 2013/0315380 A1 | 11/2013 | Davis et al. |
| 2014/0127446 A1 | 5/2014 | Davis et al. |
| 2015/0146866 A1 | 5/2015 | Tuohimaa et al. |
| 2017/0040138 A1 | 2/2017 | Kumar et al. |

\* cited by examiner

MOUNTED X-RAY WINDOW

CLAIM OF PRIORITY

This application claims priority to U.S. Provisional Patent Application No. 62/322,557, filed on Apr. 14, 2016, which is incorporated herein by reference in its entirety.

FIELD OF THE INVENTION

The present application is related generally to x-ray windows.

BACKGROUND

X-ray windows are designed to allow high transmission of x-rays, even low-energy x-rays. For some applications, it can be important for x-ray windows to block visible and infrared light transmission, in order to avoid creating undesirable noise in sensitive instruments.

It can be important for x-ray windows to be strong, because the x-ray window may need to withstand a differential pressure of about 1 atm. X-ray windows need sufficient thickness for strength, but not a thickness that will cause excessive attenuation of x-rays. A vacuum on one side and air on an opposite side can cause the x-ray window to bow or deflect, damaging the x-ray window, and also possibly causing a short circuit by creating an unintended electrical-current path. Thus, it can be important to minimize deflection.

It can be important for x-ray windows to be substantially impervious to gases. It can be important for the x-ray window to form a hermetic seal.

SUMMARY

It has been recognized that it would be advantageous to provide a strong x-ray window that is substantially opaque to visible and infrared light, transmissive to x-rays, substantially impervious to gases, and able to form a hermetic seal. The present invention is directed to various embodiments of mounted x-ray windows, and methods of mounting x-ray windows, that satisfy these needs. Each embodiment may satisfy one, some, or all of these needs.

The mounted x-ray window can comprise a housing with an aperture and a flange encircling the aperture. The flange can have an inner-side that faces an interior of the housing. A film can be located on the inner-side of the flange and can extend across the aperture. A ring or sheet of elastic adhesive can be sandwiched between the film and the inner-side of the flange and can form a hermetic-seal between the film and the housing.

The method can comprise: (1) providing a housing with an aperture, a flange encircling the aperture, the flange having an inner-side that faces an interior of the housing; (2) placing a ring of elastic adhesive on the inner-side of the flange; (3) placing a film on the ring of elastic adhesive on the inner-side of the flange, extending across and covering the aperture, with the ring of elastic adhesive sandwiched between the film and the inner-side of the flange; (4) and baking the housing, the ring of elastic adhesive, and the film.

BRIEF DESCRIPTION OF THE DRAWINGS (DRAWINGS MIGHT NOT BE DRAWN TO SCALE

FIG. 1 is a schematic, cross-sectional side-view of a mounted x-ray window 10, including a film 12 sealed to a housing 11 by a ring of elastic adhesive 13, the ring of elastic adhesive 13 immediately adjoining the housing 11 and the film 12, in accordance with an embodiment of the present invention.

Figure 2:
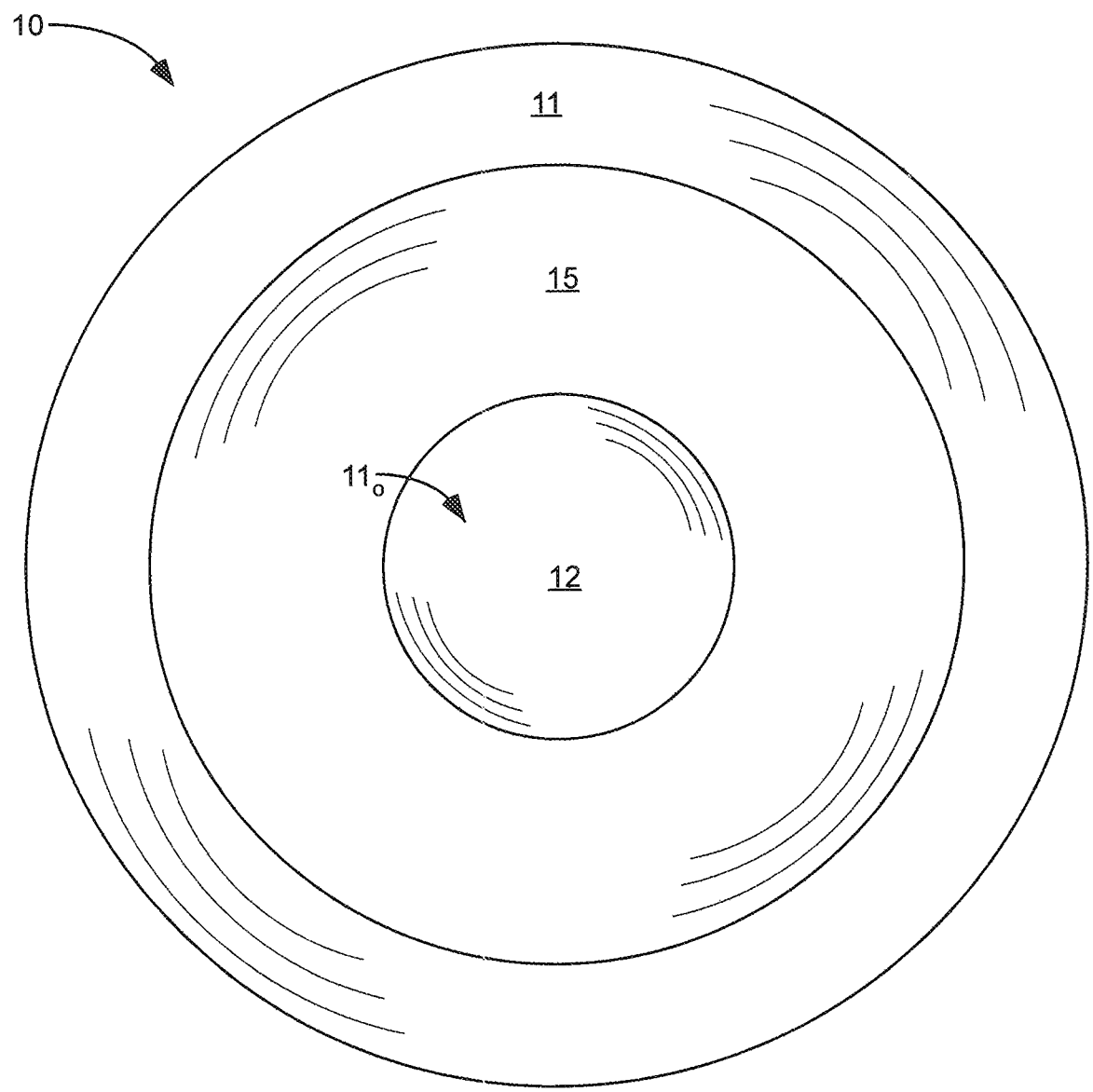

FIG. 2 is a schematic top-view of the mounted x-ray window 10 of FIG. 1, in accordance with an embodiment of the present invention.

Figure 3:
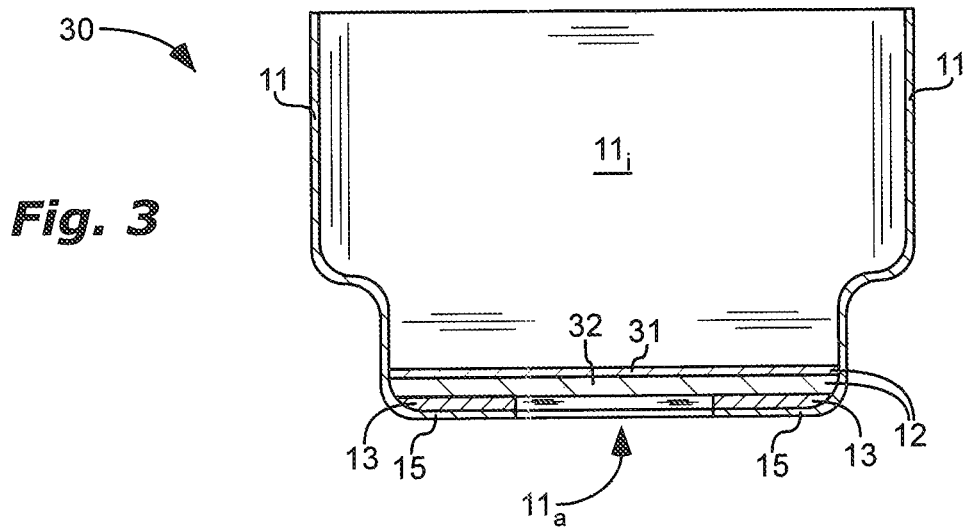

FIG. 3 is a schematic, cross-sectional side-view of a mounted x-ray window 30, similar to mounted x-ray window 10, but also showing that the film 12 can include a first layer 31 and a second layer 32, with the second layer 32 sandwiched between the first layer 31 and the ring of elastic adhesive 13, in accordance with an embodiment of the present invention.

Figure 4:
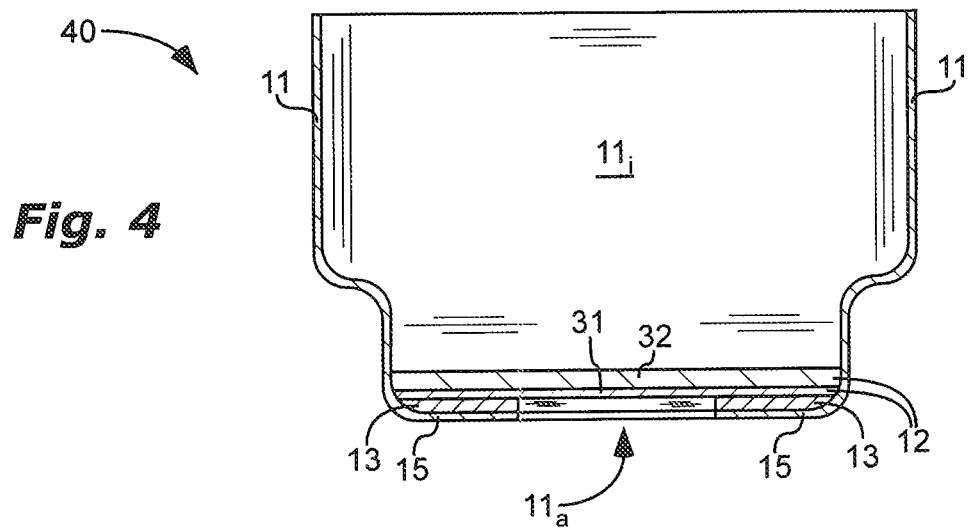

FIG. 4 is a schematic, cross-sectional side-view of a mounted x-ray window 40, similar to mounted x-ray window 10, but also showing that the film 12 can include a first layer 31 and a second layer 32, with the first layer 31 sandwiched between the second layer 31 and the ring of elastic, adhesive 13, in accordance with an embodiment of the present invention.

Figure 5:
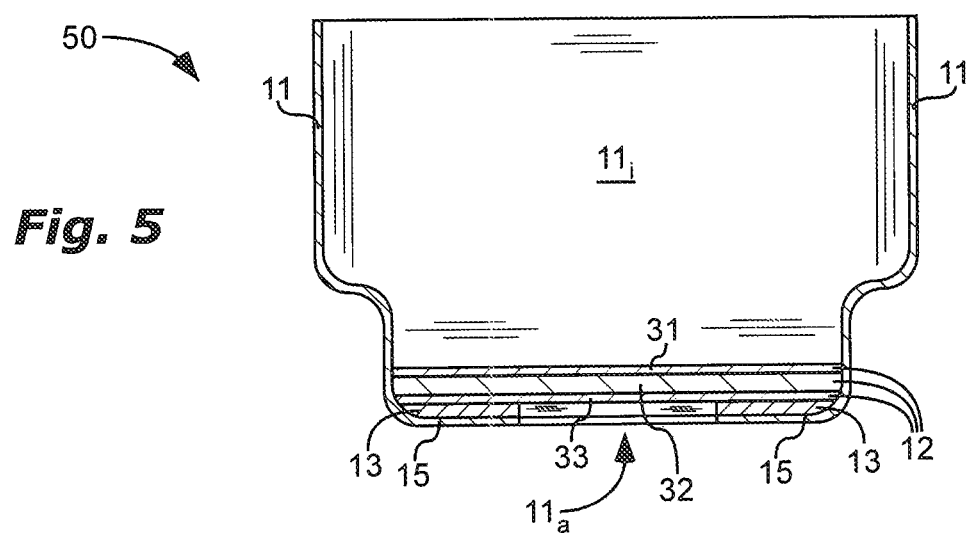

FIG. 5 is a schematic, cross-sectional side-view of a mounted x-ray window 50, similar to mounted x-ray window 10, but also showing that the film 12 can include a first layer 31, a second layer 32, and a third layer 33, with the second layer 32 sandwiched between the first layer 31 and the third layer 33, in accordance with an embodiment of the present invention.

Figure 6:
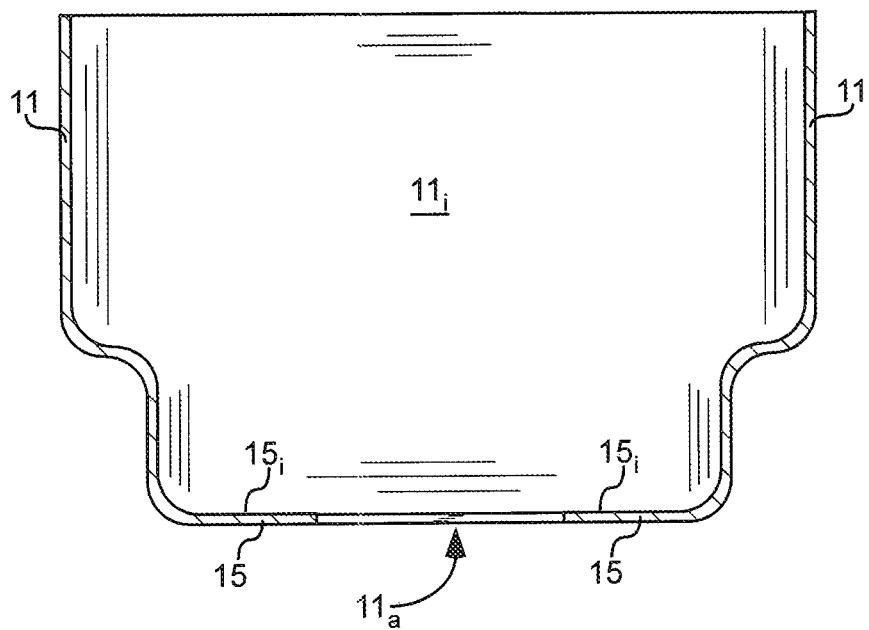

FIG. 6 is a first step in mounting an x-ray window, providing a housing 11 with an aperture $11_a$, and a flange 15 encircling the aperture $11_a$, the flange 15 having an inner-side $15_i$ that faces an interior $11_i$ of the housing 11, in accordance with an embodiment of the present invention.

Figure 7:
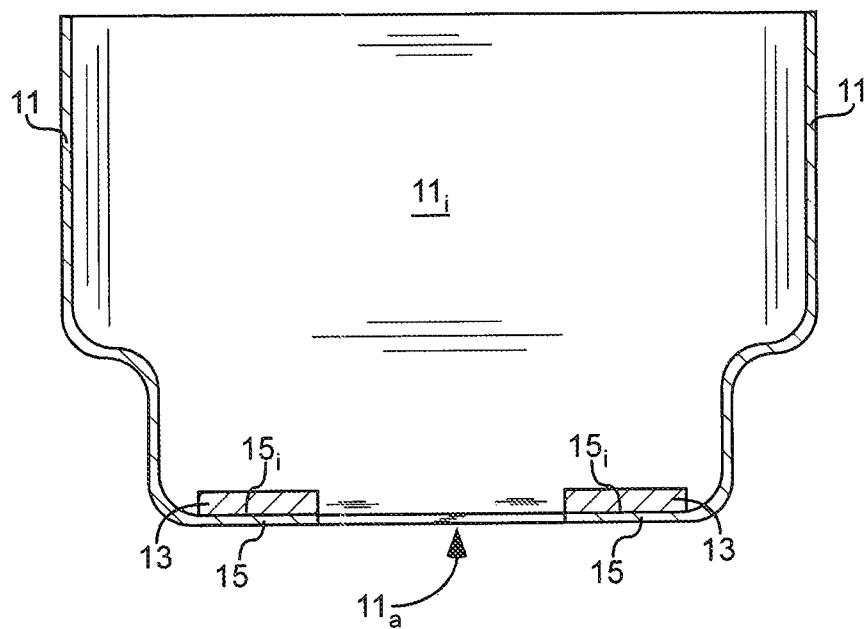

FIG. 7 is a second step in mounting an x-ray window, placing a ring of elastic adhesive 13 on the inner-side $15_i$ of the flange 15, in accordance with an embodiment of the present invention.

Figure 8:
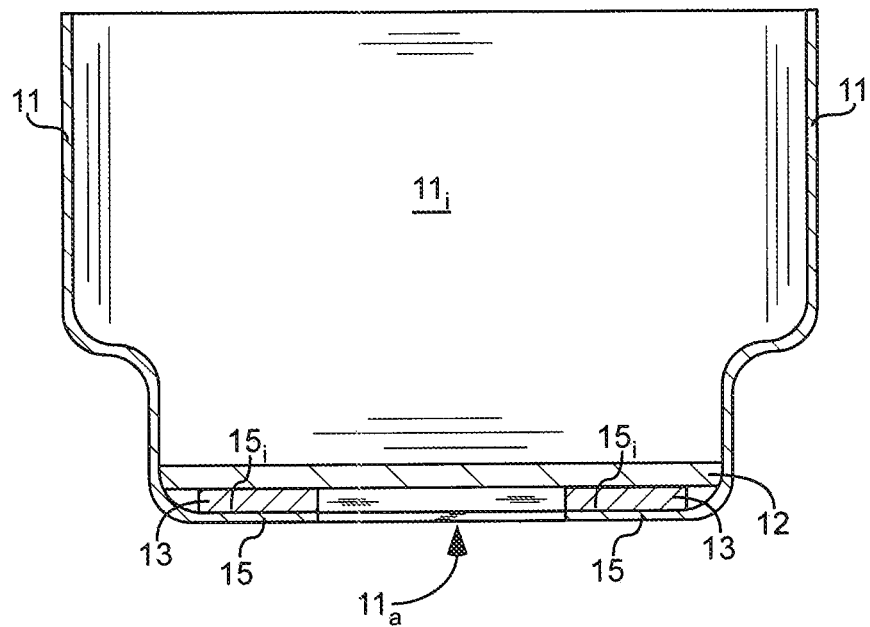

FIG. 8 is a third step in mounting an x-ray window, placing a film 12 on the ring of elastic adhesive 13 on the inner-side $15_i$ of the flange 15, the film 12 extending across and covering the aperture $11_a$, with the ring of elastic adhesive 13 sandwiched between the film 12 and the inner-side $15_i$ of the flange 15, in accordance with an embodiment of the present invention.

Figure 9:
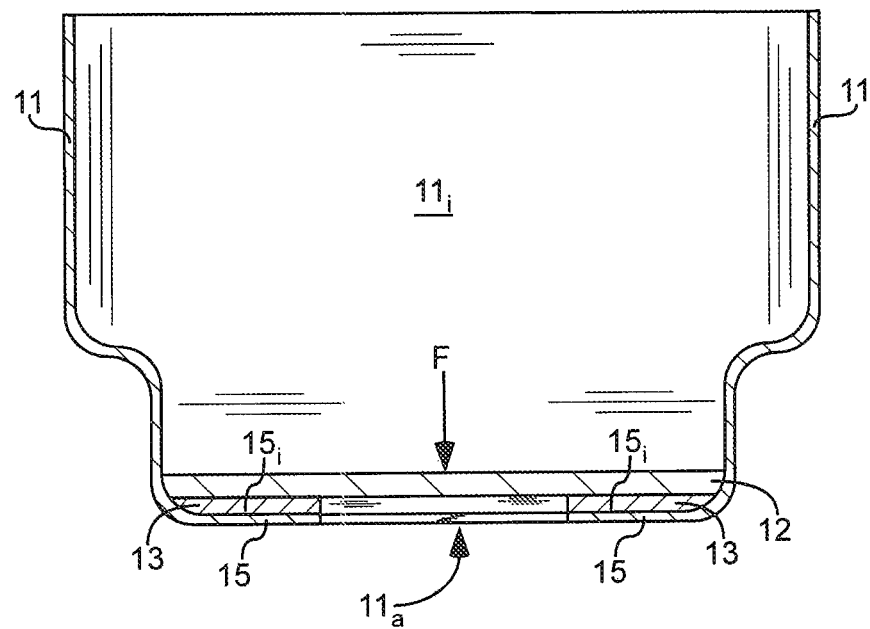

FIG. 9 is a fourth step in mounting an x-ray window, applying a force to the film 12 and baking the housing 11, the ring of elastic adhesive 13, and the film 12, in accordance with an embodiment of the present invention.

Figure 10:
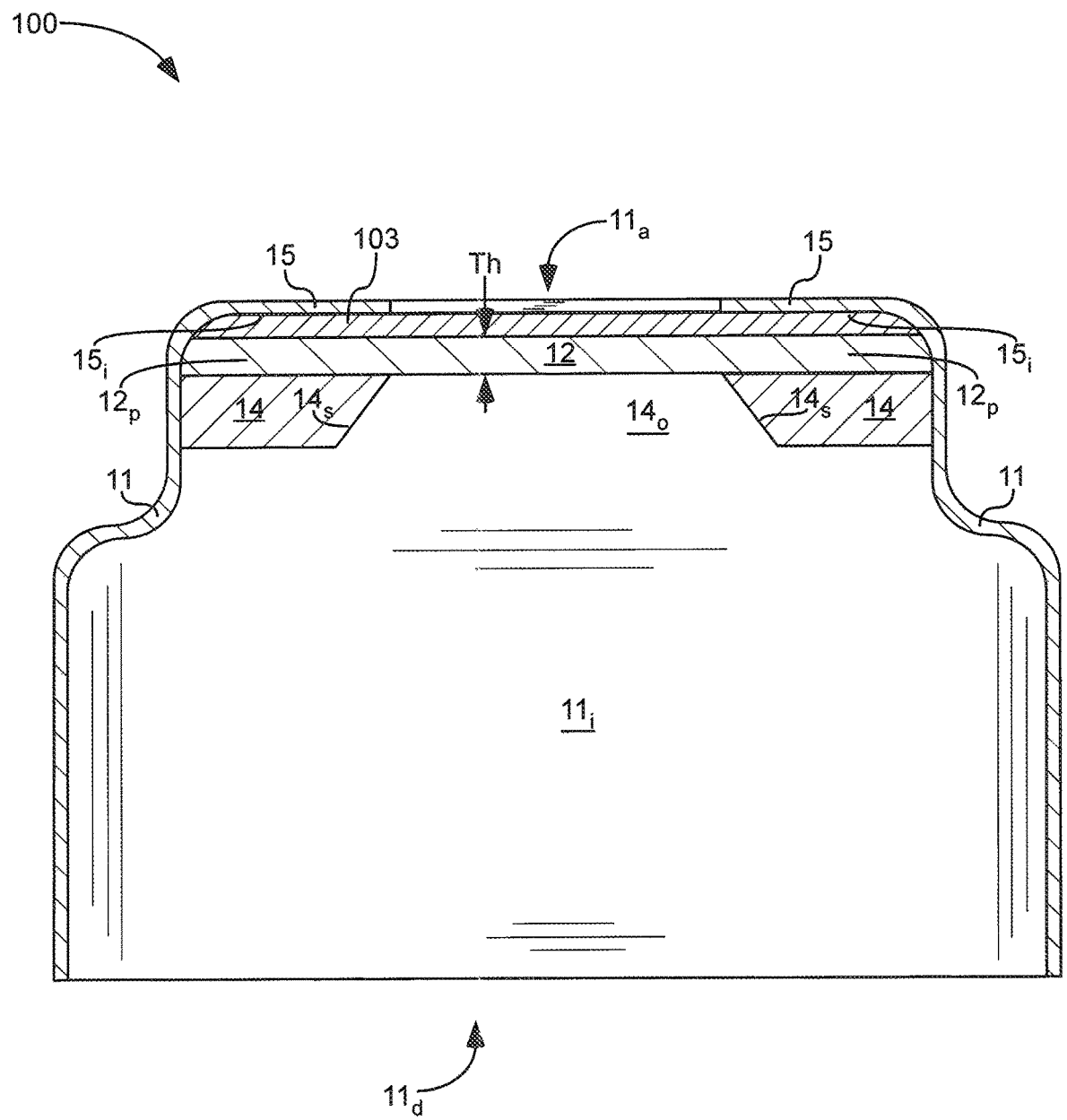

FIG. 10 is a schematic, cross-sectional side-view of a mounted x-ray window 10, including a film 12 sealed to a housing 11 by a sheet of elastic adhesive 103, the sheet of elastic adhesive 103 immediately adjoining the housing 11 and the film 12, in accordance with an embodiment of the present invention.

DETAILED DESCRIPTION

As illustrated in FIGS. 1 & 2, a mounted x-ray window 10 is shown comprising a housing 11 with an aperture $11_a$, a film 12, and a ring of elastic adhesive 13. The film 12 can extend across the aperture $11_a$. The ring of elastic adhesive 13 can have an opening aligned with the aperture $11_a$. The opening of the ring of elastic adhesive 13 can be about the same size as, or larger than, the aperture $11_a$. The ring of elastic adhesive 13 can encircle the aperture $11_a$ of the housing 11 and can be sandwiched between the film 12 and the housing 11. The ring of elastic adhesive can form a hermetic-seal to the housing. The film 12 can be attached or sealed to the housing 11 by the ring of elastic adhesive 13, forming the hermetic-seal between the film 12 and the housing 11. Thus, the film 12 can immediately adjoin the ring of elastic adhesive 13. Alternatively, another component can be sandwiched between the film 12 and the ring of elastic adhesive 13. A support structure 14, described below, can be sandwiched between the film 12 and the ring of elastic adhesive 13.

The housing 11 can be metallic. The housing can include nickel or a nickel alloy.

The housing 11 can include a flange 15 encircling the aperture $11_a$. The flange 15 can have an inner-side $15_i$ that faces an interior $11_i$ of the housing 11. The ring of elastic adhesive 13 can be sandwiched between the film 12 and the inner-side $15_i$ of the flange 15 and can attach or seal the film 12 to the inner-side $15_i$ of the flange 15, forming a hermetic-seal between the film 12 and the flange 15. Damage to the film 12 can be avoided by mounting the film 12 on the inner-side $15_i$ of the flange 15—if the film 12 is mounted on the opposite, outer side of the flange 15, air pressure can press the film 12 against an edge of the flange 15, which can damage the film.

The film 12 can include some or all of the properties (e.g. low deflection, high x-ray transmissivity, low visible and infrared light transmissivity) of the x-ray window described in U.S. patent application Ser. No. 14/597,955, filed on Jan. 15, 2015, which is incorporated herein by reference in its entirety.

For example, the film 12 can include one or more of the following: silicon (e.g. silicon nitride), a polymer (e.g. polyimide), beryllium, carbon nanotubes, graphene, hexamethyldisilazane, amorphous carbon, diamond, diamond-like carbon, boron hydride, and aluminum. Some of these materials can be used for strength, some for blocking visible and/or infrared light, some for gas-tightness, and some for corrosion-resistance.

If the film 12 includes silicon nitride, examples of its material composition include at least 90% silicon nitride in one aspect, at least 95% silicon nitride in another aspect, or at least 99% silicon nitride in another aspect. The film 12, including silicon nitride, can be made by depositing nitrogen into surface(s) of a silicon wafer, then etching a center region to a desired thickness.

An outer portion of the silicon wafer can be an annular-support 14 attached to a perimeter $12_p$ of the film 12. The annular-support 14 can provide structural support for the film 12. The annular-support 14 can be made of or can include silicon. The annular-support 14 can have an opening $14_o$, which can be formed during an etch of the silicon wafer. The opening $14_o$ of the annular-support 14 can align with the aperture $11_a$ of the housing 11. The film 12 can extend across the opening $14_o$ of the annular-support 14. Although not shown in the figures, there can be a pair of annular-supports 14 sandwiching the film 12.

The etch of the silicon wafer can extend not only vertically into the film, but also horizontally into the annular-support 14. Thus, the annular-support 14 can include a sloped-face $14_s$ at the opening $14_o$ and the annular-support 14 can have a smaller inner diameter $D14_a$ adjacent to the film 12 sloping to a larger inner diameter $D14_b$ farther from the film 12.

It can be important to locate the annular-support 14 on an opposite side of the film 12 from the ring of elastic adhesive 13 because by doing so the sloped-face $14_s$ can allow x-rays to expand into the interior $11_i$ of the housing 11. Also, locating the annular-support 14 on an opposite side of the film 12 from the ring of elastic adhesive 13 can increase surface area of attachment between the film 14 and the housing and can avoid air pressure separating the film 12 from the annular-support 14.

Some films 12 (e.g. silicon nitride) can be brittle due to internal stress. A mounting process, the annular-support 14, and the ring of elastic adhesive 13, can release at least some of this stress, resulting in a more robust film 12. For example, the film 12 and annular-support 14 can be mounted to the housing 11 with the ring of elastic adhesive 13 by baking. The film 12 can have a very different coefficient of thermal expansion than the housing 11. If the annular-support 14 has a similar coefficient of thermal expansion to the film 12, and thus also very different from the housing 11, then stresses in the film 12 can be transferred to the annular-support 14 during the baking process. The annular-support 14 can be substantially thicker than the film 12, and thus withstand more stress than the film 12, because the annular-support 14 can be located where it won't block desired x-rays (e.g. outside of the aperture $11_a$ of the housing 11).

Examples of differences between the coefficients of thermal expansion of the housing 11 and the annular-support 14 include at least 5 μm/(m*K) in one aspect, at least 7 μm/(m*K) in another aspect, or at least 9 μm/(m*K) in another aspect. Examples of similarities between the coefficients of thermal expansion of the film 12 and the annular-support 14 include less than 1.5 μm/(m*K) in one aspect, less than 1 μm/(m*K) in another aspect, less than 0.7 μm/(m*K) in another aspect, less than 0.5 μm/(m*K) in another aspect, or less than 0.3 μm/(m*K) in another aspect.

Use of a ring of elastic adhesive 13 can also aid in reducing stress in the film 12. Elastic generally means a material able to resume its normal shape spontaneously after stretching or distortion. As used herein, elastic materials have a relatively low modulus of elasticity, such as for example less than 50 GPa in one aspect, less than 20 GPa in another aspect, less than 10 GPa in another aspect, or less than 5 GPa in another aspect. Elastic materials include many polymers, including polyimide (modulus of elasticity 3 GPa). Thus, the ring of elastic adhesive 13 can be or can include a polymer, and can be or can include polyimide.

The housing 11 can be shaped for easier placement of the film 12 and the ring of elastic adhesive 13. The housing 11 can have two openings—the aperture $11_a$ and a distal-opening $11_d$, opposite of each other and located at opposite ends of the housing 11. The distal-opening $11_d$ can have a larger diameter $D_d$ than a diameter $D_f$ of the flange 15 (measured inside of the housing 11). This can allow easy placement of the film 12 and the ring of elastic adhesive 13 because they can naturally center themselves when placed in the housing 11, and can allow a larger area for a detector at the distal-opening $11d$.

It can be important that the mounted x-ray window 10, and particularly the ring of elastic adhesive 13, is capable of withstanding high temperatures without substantial degradation or failure of the hermetic-seal, because the overall device can be improved by high temperatures during manufacturing. For example, the mounted x-ray window 10 can be used with an x-ray detector. It can be important that an interior $11_i$ of the housing 11 has a very low pressure, for proper cooling of the detector, and to avoid interference of x-rays by air molecules. In order to obtain and maintain this low pressure, the housing 11 can be baked at a high temperature (e.g. ~400° C.) to drive gas molecules out of the housing. The detector can then be sealed to the housing at a high temperature (e.g. ~400° C.) to activate getters, which can continuously remove gas molecules.

The ring of elastic adhesive 13 can be a material capable of withstanding a temperature of at least 250° C. in one aspect, a temperature of at least 300° C. in another aspect, or a temperature of at least 400° C. in another aspect, without substantial degradation or failure of the hermetic-seal. Polyimide meets this requirement.

By proper selection of the ring of elastic adhesive 13, and a proper method of manufacture (e.g. baking), the housing 11 can be hermetically-sealed with a relatively low internal pressure (e.g. <than 5 pascals in one aspect, <than 2 pascals in another aspect, or <than 1 pascal in another aspect) and can have a relatively low leak-rate (e.g. $<1 \times 10^{-14}$ bar*L/s in one aspect or $<2 \times 10^{-15}$ bar*L/s in another aspect).

The film 12 can have various thicknesses Th, depending on material of construction, span-width, and use. For example, the film 12 can have a thickness Th of <10 μm in one aspect, <1 μm in another aspect, or <600 nm in another aspect; and >400 nm in one aspect, >50 nm in another aspect, or >5 nm in another aspect.

Mounted x-ray windows 30, 40, and 50, shown in FIGS. 3-5, can be similar to mounted x-ray window 10, except that in mounted x-ray windows 30, 40, and 50 the film 12 can include a first layer 31 and a second layer 32 (and also a third layer 33 in FIG. 5). In mounted x-ray window 30, the second layer 32 is sandwiched between the first layer 31 and the ring of elastic adhesive 13. In mounted x-ray window 40, the first layer 31 is sandwiched between the second layer 31 and the ring of elastic adhesive 13. In mounted x-ray window 50, the second layer 32 is sandwiched between the first layer 31 and the third layer 33. Examples of materials of the first layer 31, the second layer 32, and the third layer 33 include silicon nitride, a polymer (e.g. polyimide), beryllium, carbon nanotubes, graphene, hexamethyldisilazane, amorphous carbon, diamond, diamond-like carbon, boron hydride, and aluminum. Each of the first layer 31, the second layer 32, and the third layer 33 can include one or more of these materials. One, two, or all three of the first layer 31, the second layer 32, and the third layer 33 of the film 12 can extend across the aperture $11_a$.

As shown in FIG. 10, a sheet of elastic adhesive 103 can be used instead of a ring of elastic adhesive 13. The term "ring of elastic adhesive" may be replaced with "sheet of elastic adhesive" anywhere herein. Possible advantages of using a sheet of elastic adhesive 103 instead of a ring of elastic adhesive 13 include providing structural-support to the film 12 and improved gas-diffusion barrier. Possible disadvantages of using a sheet of elastic adhesive 103 instead of a ring of elastic adhesive 13 include increased attenuation of x-rays, spectral contamination, increased outgassing, increased stress in the film due to coefficient of thermal expansion mismatch, and manufacturing difficulties. The advantages and disadvantages can be weighed for each application in order to decide whether to use a sheet of elastic adhesive 103 or a ring of elastic adhesive 13.

A method of mounting an x-ray window can comprise some or all of the following steps, which can be performed in the following order. There may be additional steps not described below. These additional steps may be before, between, or after those described.

1. Providing a housing 11 with an aperture $11_a$. The housing 11 can also include a flange 15 encircling the aperture $11_a$, the flange 15 having an inner-side $15_i$ that faces an interior $11_i$ of the housing 11. See FIG. 5.

2. Locating (by hand, with a hand tool, by machine, pouring a liquid, etc.) a ring of elastic adhesive 13 on the housing (e.g. on the inner-side $15_i$ of the flange 15). See FIG. 6.

3. Locating a film 12 over the ring of elastic adhesive 13 (e.g. on the inner-side $15_i$ of the flange 15). The film 12 can extend across and can cover the aperture $11_a$, with the ring of elastic adhesive 13 sandwiched between the film 12 and the housing 11 (e.g. the inner-side $15_i$ of the flange 15). See FIG. 7.

4. Baking the housing 11, the ring of elastic adhesive 13, and the film 12 at a temperature of at least 300° C. in one aspect or at least 400° C. in another aspect. The bake can extend for a sufficient time to relieve stress in the film 13, to soften the ring of elastic adhesive 13, and to degas the housing 11 (e.g. at least 1 hour in one aspect or at least 3 hours in another aspect). A force can be applied to the film 12 while baking, in order to improve the hermetic seal. For example, the force can be at least one newton in one aspect, at least 5 newtons in another aspect, or at least 10 newtons in another aspect. See FIG. 8.

The housing 11, the ring of elastic adhesive 13, and the film 12 can have properties as described above.

What is claimed is:

1. A method of mounting an x-ray window, the method comprising the following steps in the following order:
   a) providing a housing with an aperture, a flange encircling the aperture, the flange having an inner-side that faces an interior of the housing;
   b) locating a ring of elastic adhesive on the inner-side of the flange;
   c) locating a film over the ring of elastic adhesive on the inner-side of the flange, extending across and covering the aperture, with the ring of elastic adhesive sandwiched between the film and the inner-side of the flange;
   d) baking the housing, the ring of elastic adhesive, and the film at a temperature of at least 300° C.; and
   e) hermetically-sealing the housing and the x-ray window with an internal pressure less than 5 pascals.

2. The method of claim 1, wherein the ring of elastic adhesive includes polyimide.

3. The method of claim 1, further comprising:
   a) etching a center region of a silicon wafer, forming an annular-support with an opening and the film extending across the opening, the film having a material composition comprising silicon nitride and the annular-support having a material composition comprising silicon; and
   b) the annular-support located on an opposite side of the film from the ring of elastic adhesive.

4. The method of claim 1, wherein:
   a) the housing has two openings, the aperture and a distal-opening, opposite of each other and located at opposite ends of the housing; and
   b) the flange is farther from the distal-opening than any other portion of the housing.

5. A mounted x-ray window, comprising:
   a) a housing including:
      i) an aperture;
      ii) a flange encircling the aperture, the flange having an inner-side that faces an interior of the housing, the interior of the housing having a pressure less than 5 pascals;
   b) a film:
      i) extending across the aperture and mounted on the inner-side of the flange;

ii) having a material composition comprising silicon nitride;
c) a ring of elastic adhesive:
  i) sandwiched between the film and the inner-side of the flange;
  ii) forming a hermetic-seal to the housing;
d) an annular-support:
  i) having an opening;
  ii) attached to a perimeter of the film with the film extending across the opening;
  iii) located on an opposite side of the film from the ring of elastic adhesive;
  iv) having a material composition comprising silicon; and
  v) including a sloped-face at the opening with a smaller inner diameter adjacent to the film sloping to a larger inner diameter farther from the film.

6. The mounted x-ray window of claim 5, wherein the opening of the annular-support aligns with the aperture of the housing.

7. The mounted x-ray window of claim 5, wherein:
a) the housing has two openings, the aperture and a distal-opening, opposite of each other and located at opposite ends of the housing; and
b) the flange is farther from the distal-opening than any other portion of the housing.

8. The mounted x-ray window of claim 5, wherein the ring of elastic adhesive immediately adjoins the housing and the film.

9. A mounted x-ray window comprising:
a) a housing including:
  i) an aperture;
  ii) a flange encircling the aperture, the flange having an inner-side that faces an interior of the housing, the interior of the housing having a pressure less than 5 pascals;
b) a film located on the inner-side of the flange and extending across the aperture; and
c) a ring of elastic adhesive, a sheet of elastic adhesive, or both:
  i) sandwiched between the film and the inner-side of the flange; and
  ii) forming a hermetic-seal to the housing.

10. The mounted x-ray window of claim 9, further comprising the ring of elastic adhesive encircling the aperture of the housing.

11. The mounted x-ray window of claim 10, wherein the film has a material composition comprising silicon nitride.

12. The mounted x-ray window of claim 10, wherein the film includes a silicon nitride thin film sandwiched between two aluminum thin films.

13. The mounted x-ray window of claim 10, wherein the ring of elastic adhesive is capable of withstanding a temperature of at least 300° C. without failure of the hermetic-seal.

14. The mounted x-ray window of claim 10, wherein the ring of elastic adhesive has a modulus of elasticity of less than 5 GPa.

15. The mounted x-ray window of claim 10, wherein:
a) the housing is hermetically-sealed with an internal pressure of less than 5 pascals; and
b) the housing has a leak-rate of less than $1 \times 10^{-14}$ bar*L/s.

16. The mounted x-ray window of claim 10, wherein:
a) the housing has two openings, the aperture and a distal-opening, opposite of each other and located at opposite ends of the housing; and
b) the distal-opening is larger than a diameter of the flange, measured inside of the housing.

17. The mounted x-ray window of claim 10, further comprising an annular-support, wherein:
a) the annular-support is attached to a perimeter of the film;
b) the annular-support has an opening;
c) the film extends across the opening of the annular-support;
d) the annular-support is located on an opposite side of the film from the ring of elastic adhesive;
e) a difference between a coefficient of thermal expansion of the housing and a coefficient of thermal expansion the annular-support is at least 7 μm/(m*K); and
f) a difference between a coefficient of thermal expansion of the film and a coefficient of thermal expansion the annular-support is less than 0.7 μm/(m*K).

18. The mounted x-ray window of claim 17, wherein the annular-support includes a sloped-face at the opening and the annular-support has a smaller inner diameter adjacent to the film sloping to a larger inner diameter farther from the film.

19. The mounted x-ray window of claim 17, wherein the annular-support has a material composition comprising silicon and the housing is metallic.

20. The mounted x-ray window of claim 10, wherein the film has a thickness of <10 μm and >400 nm.

* * * * *